United States Patent [19]

Bodycomb, Jr.

[11] 3,957,571

[45] May 18, 1976

[54] SURFACE TREATMENT OF ASBESTOS FIBERS

[75] Inventor: Frederick Mercer Bodycomb, Jr., Englewood, Colo.

[73] Assignee: Johns-Manville Corporation, Denver, Colo.

[22] Filed: Oct. 10, 1974

[21] Appl. No.: 513,800

[52] U.S. Cl. ................................ 162/3; 162/153; 162/155; 162/182; 427/215
[51] Int. Cl.² ........................................... B44D 1/16
[58] Field of Search .............. 162/3, 153, 182, 155; 427/202, 333, 215

[56] References Cited
UNITED STATES PATENTS

| | | | |
|---|---|---|---|
| 3,535,150 | 10/1970 | Lipsett | 162/153 X |
| 3,630,012 | 12/1971 | Guetler | 162/153 X |
| 3,715,230 | 2/1973 | Sadler | 162/153 X |

*Primary Examiner*—Robert L. Lindsay, Jr.
*Attorney, Agent, or Firm*—Robert M. Krone; Joseph J. Kelly; James W. McClain

[57] ABSTRACT

Treatment of asbestos fiber with a first coating of from about 0.1 to 5 weight percent of a phosphate, or acid thereof, and subsequent addition of a nonfoaming anionic dispersant on the coated fiber produces an asbestos fiber product that possesses improved filtration properties. This treated asbestos improves the production rate of articles from cement slurries or pastes containing asbestos.

30 Claims, No Drawings

SURFACE TREATMENT OF ASBESTOS FIBERS

This invention relates to asbestos fibers that have been treated or contacted with a combination of a phosphate, or acid thereof, and a nonfoaming anionic dispersant to improve their filtration characteristics, and to the manufacturer of asbestos-cement products using the treated asbestos fibers.

BACKGROUND OF THE INVENTION

Asbestos fiber is used extensively in a number of common products such as asbestos-cement boards, sheets, shingles, pipe, paper, millboard, etc., which are produced by the so-called "wet" or "dry" processes. Both processes include filtration in which a liquid, typically water, is withdrawn from within a mass or body containing asbestos fibers.

The wet process conventionally involves the steps of forming an aqueous slurry of asbestos fibers, Portland cement, silica, and other minerals, fillers, binders, and fibers in water, flowing the slurry onto a filter element upon which the dispersed solids of the slurry may be collected, removing water in the slurry through the filter element by filtration, with or without accompanying pressure forming, and then removing the formed mass of asbestos fibers and cement from the filter element. Because the asbestos fibers and the finely divided cement particles inhibit filtration, there are very practical limitations upon the thickness of the resulting layers which can be collected on filter elements in this fashion. Thus, as the collected mass builds up on the filter element, the rate of filtration rapidly decreases, making it impractical to form structures of great thickness with a rate of through-put which must be obtained in commercial operations.

In the conventional dry process used to form asbestos-cement articles, the dry materials, such as asbestos, silica, cement, and pigment, are blended together and formed into batches. Sufficient water is added to the batch to form a plastic paste which can be molded, calendered, pressed, or extruded prior to standard asbestos-cement curing operations.

The filtration properties of chrysotile asbestos fibers differ substantially with the source or mine location, as well as by type, grade, and consistency, ranging from a relatively fast filtering "harsh" fiber to a slow filtering "soft" fiber. Typical of the latter class of fibers are chrysotile asbestos materials found in the Quebec, Canada area. The filtration characteristics of chrysotile asbestos are a significant consideration in determining the suitability or utility of a particular chrysotile fiber or fiber blend in wet process and dry process manufacturing procedures.

A large number of treatment methods have previously been proposed and evaluated for the purpose of increasing the filtration rate of the slower filtering fibers. These procedures include thermal treatment of the fiber; the application of assorted coatings to the fiber; the use of organic coagulating agents and inorganic salt solutions; and soaking the fibers in sodium silicate solutions followed by dewatering with an acid treatment to minimize the accelerating effect of sodium silicate on hydraulic cement. However, notwithstanding the disadvantages presented by the slower filtration fiber in wet machine processing, only a very few of these treatments methods have been extensively used for upgrading the filtration characteristics of chrysotile asbestos fiber.

For example, a silicate treatment of asbestos fibers increases filtration rates, but results in considerable decrease in strength of products incorporating the treated fiber when large quantities of silicate are added in an effort to greatly increase filtration rates. A preferred silicate treatment procedure, which is used but can nonetheless result in asbestos-cement products of decreased strength at high silicate levels, is described in U.S. Pat. No. 3,173,831. This method, which includes spraying a silicate solution onto asbestos fibers, greatly improves the filtration characteristics of the fiber, but has a strength-decreasing effect on asbestos-cement products. Thus, for practical purposes, it was necessary to limit the amount of silicate added to the fiber to prevent a serious decline in product strength. While this limited amount of silicate improved the filtration characteristics somewhat, further improvement was still desirable. Higher amounts of silicate would further improve filtration, but accompanying manufacturing problems and resulting strength losses make the higher amounts of silicate impractical.

It has previously been found that a nonfoaming anionic dispersant can be added to chrysotile asbestos fibers, or to a slurry or paste containing asbestos fibers, to improve the filtration characteristics of the fiber, as described in U.S. Pat. No. 3,891,498 and Canadian Pat. No. 886,051. While this treatment produces improved filtration rates, it has been found that the effect of the nonfoaming anionic dispersant is not cumulative. That is, while increased filtration rates result from addition of the dispersant up to a certain weight percentage level, once that level is reached further addition of the dispersant does not result in additional increases in the filtration rate. The maximum filtration rate achieved by the addition of the nonfoaming anionic dispersant is thus limited.

It has recently been proposed to combine the silicate treatment with the addition of a nonfoaming anionic dispersant, as disclosed in U.S. Pat. No. 3,715,230. Such a process results in an additive effect on improved filtration and, unexpectedly, does not decrease the strength of the products made from the treated fibers, as do fibers treated with the same level of an alkali metal silicate alone. In addition, this dual treatment theoretically permits the use of higher concentrations of alkali metal silicate than was previously thought to be commercially practical. However, because of the tacky nature of sodium silicate, manufacturing problems develop long before the theoretical maximum amount of sodium silicate is reached. Also, there is still a present need to increase further the filtration rate of chrysotile asbestos fiber.

It has also recently been proposed to increase the filtration rate of asbestos fibers by treating the fibers with an aqueous solution of a phosphate compound or a corresponding acid, as disclosed in U.S. Pat. No. 3,535,150. While this phosphate treatment improves the filtration characteristics of untreated fiber without significantly reducing the strength of subsequent asbestos-cement products, the filtration characteristics of the phosphate-treated fiber are still much lower than desired.

BRIEF SUMMARY OF THE INVENTION

It has now been discovered that if chrysotile asbestos fibers are contacted with a combination of a phosphate, polyphosphate, or corresponding acid and a nonfoaming anionic dispersant the resultant asbestos fiber displays unexpectedly high filtration characteristics. The so-treated fiber does not significantly affect the strength of asbestos-cement products in which the fiber is used.

The preferred nonfoaming anionic dispersant for use in the present invention is an agent comprised of a sulfonic acid derivative, such as the sodium salt of condensed naphthalene sulfonic acid. The amount of nonfoaming anionic surfactant used should be at least about 0.05 weight percent, based on the weight of asbestos fibers present in the slurry. The nonfoaming anionic surfactant can either be added to the asbestos fibers prior to adding the fibers to the aqueous slurry or can be added directly to the aqueous slurry of asbestos fibers. If added to the fibers prior to adding the fibers to the slurry the dispersant need not be coated onto the fibers or evenly dispersed among the fibers since the dispersant will rapidly disperse in the water as soon as the fibers are added to the slurry.

The asbestos fibers, prior to the application of the nonfoaming anionic surfactant, are treated with an aqueous solution of a phosphate or polyphosphate, or of a corresponding acid, and optionally dried to leave a deposit on the surface of the fibers amounting to not greater than about 5% of the weight of the fibers. The phosphate compound can be applied to the fibers according to the method disclosed in U.S. Pat. No. 3,535,150 or by the method disclosed in U.S. Pat. No. 3,715,230 for treating the fibers with an alkali metal silicate.

The combination treatment using a phosphate compound and a nonfoaming anionic dispersant not only significantly improves the filtration rate of the asbestos fibers, as compared with treating only with a phosphate compound, but also eliminates problems of the dual treatment with an alkali metal silicate and a nonfoaming anionic dispersant as disclosed in U.S. Pat. No. 3,715,230. When asbestos fibers are treated with an alkali metal silicate the amount of silicate that can be applied to the fibers is limited by manufacturing problems created by the addition of more than about ½ to 1% of the fiber. For example, when 1% or more alkali metal silicate is applied to the fibers according to the process disclosed in U.S. Pat. No. 3,715,230 the alkali metal silicate adheres to the walls of the ducts or pipes carrying the air-suspended asbestos fibers eventually causing clogging and necessitating shutting down the system and cleaning out the ducts or pipes. This cleaning process is both extremely difficult and very costly in terms of manpower and lost production. While treatment of the asbestos fibers with a phosphate compound alone, as disclosed in U.S. Pat. No. 3,535,150, produces an asbestos fiber having good filtration characteristics, the dual treatment of the present invention improves those filtration characteristics significantly, resulting in a much higher production rate of products made using the treated asbestos fibers.

DETAILED DESCRIPTION AND PREFERRED EMBODIMENTS

The process of treating asbestos fiber according to the method of this invention includes as a first step the application of a phosphate compound or corresponding acid to the surface of the asbestos fibers. An aqueous solution containing the phosphate compound or acid can be sprayed onto the asbestos fibers while the fibers are maintained in a gaseous suspension. This spray procedure has been found to be particularly desirable for applying a phosphate compound to asbestos fiber if the fiber is to be subsequently packaged and transported or stored before use. The phosphate compound can also be applied to the asbestos fibers by soaking the asbestos fibers in a concentrated solution of the phosphate compound, removing the fibers, and at least partially drying the fibers to form a residue of the phosphate compound on the surface of the fibers. The phosphate compound can also be applied to the fibers while they are being agitated in a mixer, e.g. a ribbon blender.

The preferred procedure for depositing a phosphate compound on the asbestos fibers is described in U.S. Pat. No. 3,173,831. In general, the spray technique there disclosed comprises the preferred first step in the present process and involves the application of a sprayable aqueous solution of a phosphate compound, such as aluminum phosphate or orthophosphoric acid. The phosphate solution is applied in the form of a finely divided atomized spray to the asbestos fibers. The concentration of the phosphate compound in the aqueous solution is sufficient to form a residue of phosphate compound on the surface of the asbestos fibers amounting to up to 5 weight percent, based on the weight of the asbestos fibers.

While being sprayed, the fibers are maintained substantially individually in an air or gaseous suspension such as the condition that normally exists in an asbestos fiberizer, such as a Willow, an air transport duct or cyclone, or when the fibers pass through a fan or blower. Aqueous phosphate compound solutions, of suitable concentrations, can be effectively sprayed in a finely divided or atomized condition from typical commercial equipment without clogging. The application of the phosphate solution as a finely divided spray to fibers in vigorous motion promotes the addition of large quantities of the aqueous solution without producing any visible wetting or cohering of the fiber. Examples of satisfactory phosphate compounds that can be used in the present invention are aluminum phosphate, phosphoric acid, the sodium phosphates, sodium hexameta phosphate, tetrasodium pyrophosphate, sodium tripolyphosphate, etc.

In accordance with the invention, a nonfoaming anionic dispersant is added to the phosphate-treated asbestos fibers to increase further the drainage characteristics of the resultant fiber. The use of these fibers in slurries or pastes in the manufacture of asbestos-containing products, e.g., asbestos-cement pipe, results in significantly higher production rates, as compared with the use of fibers treated only with a phosphate compound.

The addition of the nonfoaming anionic dispersant to the phosphate-treated fibers can be accomplished by numerous physical procedures. An aqueous solution of the dispersant can be sprayed onto the phosphate-treated fibers while they are suspended using techniques similar to those described above for the phosphate treatment. The dispersant can also be added as a dry, finely divided solid and either blown onto the phosphate-treated asbestos fiber or simply added without any attempt to distribute the dispersant throughout the mass of fibers. Finally, the dispersant can be added, either as a liquid or as a finely divided solid, directly to the slurry or paste, either before or after the addition of the phosphatetreated asbestos fibers.

It has been found that a large number of nonfoaming anionic dispersants are effective to increase the filterability of asbestos treated with a phosphate compound, particularly an inorganic phosphate compound. Preferred dispersants include a sodium salt of condensed naphthalene sulfonic acid such as marketed by Rohm and Haas under the trademark TAMOL SN, hereinafter referred to simply as TAMOL, and a sodium lignosulfonate marketed by the Marathon Division of American Can Company under the trademark MARASPERSE N-22; other suitable dispersants include a sulfonated benzimidazol derivative of a higher fatty acid marketed by Ciba Chemical and Dye Company, Inc. under the trademark ULTRAVON WC; a sugar-free calcium lignosulfonate marketed by Lake States East and Chemical Division of St. Regis Paper Company under the trademark TORANIL B; a sodium alkyl naphthalene sulfonate marketed by National Aniline Division, Allied Chemical Corporation under the trademark NACCOSOL A; an alkyl aryl sodium sulfonate marketed by National Aniline Division, Allied Chemical Corporation under the trademark NACCOTAN A; a sodium salt of a condensed mono-naphthalene sulfonate marketed by Jacques Wolf and Company, Division of Nopco Chemical Company under the trademark LOMAR PW; a sodium salt of a condensed naphthalene sulfonate marketed by Jacques Wolf and Company, Division of Nopco Chemical Company under the trademark NOPCOSANT; a sodium salt of polymerized alkyl naphthalene sulfonic acid marketed by Dewey and Almy Chemical Division, W. R. Grace and Company under the trademark DARVAN No. 1; sodium salts of polymerized substituted benzoid alkyl sulfonic acid marketed by Dewey and Almy Chemical Division, W. R. Grace and Company under the trademark DARVAN No. 2; sodium salts of polymerized alkyl naphthalene sulfonic acid marketed by Dewey and Almy Chemical Division, W. R. Grace and Company under the trademark DARVAN No. 15; a monocalcium salt of polymerized alkyl aryl sulfonic acids marketed by Dewey and Almy Chemical Division, W. R. Grace and Company under the trademark DAXAD No. 21; sodium salts of polymerized substituted benzoid alkyl sulfonic acids marketed by Dewey and Almy Chemical Division, W. R. Grace and Company under the trademark DAXAD No. 23; sodium salts of substituted benzoid alkyl sulfonic acids and suspending agent marketed by Dewey and Almy Chemical Division, W. R. Grace and Company under the trademarks of DAXAD No. 27 and DARVAN No. 3; and a group comprising sulfonated naphthalene formaldehyde polymers such as a sulfonated condensate of naphthalene formaldehyde marketed by New York Color and Chemical Company, Division of American Dyewood, Inc. under the trade designation Syntan NNC; a sodium salt of a sulfonated naphthalene formaldehyde condensate marketed by Dyestuff and Chemicals Division, GAF Corporation under the trademark BLANCOL; and a sodium salt of a sulfonated naphthalene formaldehyde condensate marketed by GAF Corporation under the trademark BLANCOL N. The foregoing materials, including TAMOL and MARASPERSE, are classified as dispersants in the publication: *Detergents and Emulsifiers*, 1964 Annual, Copyright 1964 by John W. McCutcheon, Inc.

The nonfoaming anionic dispersant added in the second step of this dual treatment process is effective to produce advantageous results at very low concentrations of from about 0.05 to about 0.4 percent by weight based on the dry weight of the asbestos fiber present in the aqueous slurry or paste. Since all of the asbestos fiber used in the aqueous slurry or paste need not have been treated with the dual treatment of the present invention, fibers treated according to the present invention may contain up to 5 percent of the nonfoaming anionic dispersant. Larger amounts of the nonfoaming anionic dispersant can be used, but the added additional amounts are superfluous and do not produce any added advantages. Furthermore, as the amount of the dispersant is increased, it begins to act in its normally intended manner as a dispersant and detrimentally affects the filtration rate of the asbestos fibers. For example, the amount of dispersant used should not lower the surface tension of a conventional asbestos-cement ne slurry or paste below about 65–67 dynes/cm., as contrasted with the surface tension of ordinary water which is about 72 dynes/cm., because that would increase the tendency of the slurry to foam. The precise amount of the dispersant required to produce the desired results varies with the percentage of the particulate solids in the slurry or paste in which the asbestos fiber is to be incorporated, and the nature of the particulate solids. The dispersant should be present in the aqueous slurry or paste in amounts of at least about 0.05 weight percent, based on the weight of the chrysotile asbestos in the slurry, preferably within the range of 0.1 and 0.8 weight percent, and most preferably within the range of about 0.2 to about 0.4 weight percent.

The improved asbestos fiber product produced by the above-described process comprises at least about 0.2 weight percent phosphate solids at least partially coating the surface of the asbestos fibers, and a nonfoaming anionic dispersant distributed on the phosphate treated fibers. The fibers can optionally be dried after treatment to remove at least a portion of the water added by the coating steps. The fiber product can be compressed during packaging operations and retains its ability to improve production rates and to produce strong asbestos-cement articles after shipment and prolonged storage periods.

Asbestos-cement articles can be prepared using mixtures containing chrysotile asbestos fibers, treated according to the present invention, and a hydraulic cement. While Portland-type cements are preferred, other hydraulic cements can be used, e.g., pozzolanic cement, calcium aluminate cement, and calcium sulfate cement, can be used to replace at least part of the Portland Cement. It is often desirable, to reduce costs and improve structural properties of the final products, to include additional siliceous materials in the aqueous slurries and pastes. For example, sand, powdered silica, ground mica, ground feldspar, and the like can be present in the slurry or paste. Paper products containing chrysotile asbestos fibers can also be made utilizing the present invention.

It is also possible to practice the present invention using asbestos fibers treated only with a phosphate compound by adding the desired amount of the nonfoaming anionic dispersant directly to the slurry or paste. This embodiment is particularly desirable where, because of different manufacturing procedures, different asbestos-cement product manufacturers require different amounts of the nonfoaming anionic dispersants to be present to optimize the system.

The following examples are presented to provide a more complete understanding of the invention. The specific techniques, conditions, materials, and/or proportions set forth are exemplary and should not be construed as limiting the scope of the invention. All percentages listed in this application are weight percentages unless otherwise indicated.

EXAMPLES 1–9

A regular 4T30 grade (Quebec Asbestos Mining Association) chrysotile asbestos fiber mined in Quebec, Canada was treated with various amounts of aluminum phosphate, with and without TAMOL, and evaluated for drainage characteristics. The treated fibers were prepared by spraying the fibers with a 20 percent solution of aluminum phosphate while the fibers were being tumbled in a mixer. The dispersant, a sodium salt of condensed naphthalene sulfonic acid (TAMOL) in dry power form, was then added to the phosphate treated fibers while the fibers tumbled in the mixer.

The treated fibers were tested in a Leaf Filter Test to determine the drainage characteristics of the fiber. The results provide an indication of the production rate that can be expected when the fibers are formed into an article by filtration from a wet slurry or paste. The Leaf Filter Test is a relatively new and improved test for determining filtration rate characteristics of fibers and is described in U.S. Pat. application Ser. No. 469,491 filed on May 13, 1974 by J. C. Shiuh, which application is hereby incorporated by reference. The results of these tests are compared in Table I with the results of untreated fiber and of fiber treated with sodium silicate plus TAMOL according to the process disclosed in U.S. Pat. No. 3,715,230.

TABLE I

| Example | Fiber Treatment | Leaf Filter Test (gm/min/ft$^2$) |
| --- | --- | --- |
| 1 | No treatment (as received) | 570 |
| 2 | 1.0% Aluminum phosphate | 734 |
| 3 | 0.5% Aluminum phosphate + 0.4% TAMOL | 785 |
| 4 | 1.0% Aluminum phosphate + 0.4% TAMOL | 846 |
| 5 | 2.0% Aluminum phosphate | 751 |
| 6 | 2.0% Aluminum phosphate + 0.4% TAMOL | 872 |
| 7 | 4.0% Aluminum phosphate | 958 |
| 8 | 0.5% Sodium Silicate + 0.4% TAMOL | 811 |
| 9 | 1.0% Sodium Silicate + 0.4 TAMOL | 820 |

The drainage characteristics of the chrysotile asbestos fibers are significantly improved by the prior art treatment of sodium silicate plus TAMOL as shown by a comparison of Example 1 with Examples 8 and 9. The filtration characteristics of the chrysotile fiber are also improved by the prior art treatment with aluminum phosphate as shown by comparing Examples 2, 4, and 6 with Example 1. The most significant improvements, however, are obtained by treating the chrysotile asbestos according to the present invention as shown by comparing Examples 3, 5, and 7 with all of the other examples. The most significant aspect of the improvement shown by the presently claimed treatment is that equivalent drainage characteristics can be obtained with only about one half as much phosphate as required by the process disclosed in U.S. Pat. No. 3,535,150. This aspect offers very important manufacturing cost savings.

It has been discovered, after treating thousands of tons of chrysotile asbestos fiber with aqueous sodium silicate solutions, that an economically practical upper limit of silicate solids that can be applied to the asbestos fibers is about 0.5 percent. The reasons for this are two-fold. First, there is a limit to the amount of water that can be added to the asbestos fiber without requiring an extra and costly step of drying the fiber prior to packaging, storing, and shipping. This practical limit of water determines the concentration of sodium silicate in the aqueous treating solution for any particular silicate addition. It has been found that if more than a 0.5 percent addition is desired, the viscosity of the treating solution is excessively high resulting in sticky fibers that clog the production lines requiring expensive shut-down and clean-out procedures. When the concentration of the treating solution is reduced by increasing the ratio of water to sodium silicate, the fibers are then excessively wet for packaging and require the extra costly step of drying. Thus, Example 8, shown in Table I, represents a practical sodium silicate plus dispersant-treated fiber. However, the drainage characteristics of this fiber are not sufficient for many applications. Also, even at this treatment level of sodium silicate solids, the product lines still require occasional shut-down and clean-out which adds undesirable costs to the manufacturing process.

Treatment of chrysotile fiber with aluminum phosphate, as disclosed in U.S. Pat. No. 3,535,150, increases the filtration rate with the amount of increase being dependent upon the amount of phosphate deposited on the fiber. The addition of aluminum phosphate or phosphoric acid to water does not increase the viscosity of the resultant solutions as rapidly as does sodium silicate. Thus, the use of phosphate or phosphoric acid would appear to reduce the sticking and build-up problem encountered with treating with sodium silicate. However, aqueous solutions of aluminum phosphate or phosphoric acid are very acidic and corrosive, e.g., a 30 percent aluminum phosphate solution has a pH of about 2, thus requiring stainless steel equipment to avoid rapid deterioration of the equipment used and corresponding contamination of the fiber being treated. The use of such acidic solutions also presents hazards to employees handling the concentrated acid as well as the aqueous treating solutions.

As shown by a comparison of Example 2 with Example 3 and Example 4 with Example 5, it is apparent that when the fibers are treated according to the present invention, equivalent to improved drainage characteristics are achieved with the use of only about one half as much phosphate as required when the fibers are treated with only a phosphate compound. This means that the treating solutions according to the present invention need contain only one half the concentration of phosphate, and thus are only half as acidic, as the concentrations necessary when treating according to the process disclosed in U.S. Pat. No. 3,535,150. Also, when using the treatment process of the present invention, any fiber treatment facility need handle only about one half of the phosphate compound, such as phosphoric acid, as an identical treating facility using the process disclosed in U.S. Pat. No. 3,535,150. Lower acid usage reduces the hazards and the corrosion problems that accompny such acid usage. When treating thousands of tons of asbestos fibers, these advantages add up to substantial cost savings.

EXAMPLES 10–16

Rarely is a product made using asbestos fibers which have all been treated to improve the filtration rate. Instead, treated fibers are normally blended with untreated fibers to provide the desired drainage characteristics. This test was run to determine the drainage characteristics of various blends containing fibers treated according to the present invention, and by prior art techniques. Blends containing 75 percent of untreated 4T30 chrysotile fibers and 25 percent of fibers treated with the compounds shown in Table II in the same manner as described in Examples 2–9, and a blend of 75 percent untreated 4T30 fibers and 25 percent crocidolite asbestos fibers were passed through a standard opening device commonly used to prepare fibers for the manufacture of asbestos-cement products. This opening device is of the type commonly referred to as a Willow or an ENTOLETER, manufactured by Entoleter, Inc. The fiber blends of Examples 10–16 were then tested for drainage characteristics using the Leaf Filter Test. The results of these drainage tests are compared in Table II. Example 10, using 25 percent crocidolite asbestos fiber was included because this is a standard fiber blend commonly used in asbestoscement products. It would be desirable to replace the superior draining crocidolite fiber with chrysotile fiber since crocidolite is imported from Africa whereas chrysotile is available on the North American continent. Crocidolite fiber also presents environmental problems not encountered with chrysotile fibers.

TABLE II

| Example Number | Composition of Fiber Blend | Leaf Filter Test gm/min/ft$^2$ |
|---|---|---|
| 10 | 75% 4T30 + 25% Crocidolite | 665 |
| 11 | 75% 4T30 + 25% Chrysotile (0.5% Sodium Silicate + 0.4% TAMOL) | 690 |
| 12 | 75% 4T30 + 25% Chrysotile (2% Aluminum Phosphate) | 656 |
| 13 | 75% 4T30 + 25% Chrysotile (1% Aluminum Phosphate + 0.4% TAMOL) | 656 |
| 14 | 75% 4T30 + 25% Chrysotile (2% Aluminum Phosphate + 0.4% TAMOL) | 785 |
| 15 | 75% 4T30 + 25% Chrysotile (2% Phosphoric Acid) | 639 |
| 16 | 75% 4T30 + 25% Chrysotile (2% Phosphoric Acid + 0.4% TAMOL) | 690 |

The data in Table II show that the blends containing chrysotile fibers treated according to the prior art processes, Examples 11, 12, and 15, have about the same drainage characteristics as the commonly used blend represented by Example 10. Blends containing chrysotile asbestos fibers treated according to the present invention, Examples 13, 14, and 16, had drainage characteristics essentially equivalent to, or better, than the commonly used fibrous blend. These results show that fiber blends containing asbestos fiber treated according to the present invention could be substituted for crocidolite fibers in the presently used blends without detrimentally affecting the drainage characteristics of the resultant slurries, while providing those advantages over the prior art treated fibers discussed above.

EXAMPLES 17–24

Tests were run to determine the effect of various magnitudes of addition of TAMOL to phosphoric acid-treated fibers. Example 17 was prepared in the same manner as Example 5 previously described except that phosphoric acid was substituted for the aluminum phosphate used in Example 5. Examples 18–21 were prepared in the same manner as Example 6 except that phosphoric acid was substituted for aluminum phosphate and the TAMOL addition was varied as shown in Table III. In addition, blends were prepared in Examples 22–24 from 75 percent untreated 4T30 chrysotile asbestos fibers and 25 percent of the fibers from Examples 17, 18, and 21 respectively. Leaf Filter Tests were run on each of the samples to determine their drainage characteristics and the results of these tests are shown in Table III.

TABLE III

| Example Number | Fiber or Fiber Blend Composition | Leaf Filter Test gm/min/ft$^2$ |
|---|---|---|
| 17 | 4T30 + 2% H$_3$PO$_4$ + 0% TAMOL | 526 |
| 18 | 4T30 + 2% H$_3$PO$_4$ + 0.1% TAMOL | 621 |
| 19 | 4T30 + 2% H$_3$PO$_4$ + 0.2% TAMOL | 690 |
| 20 | 4T30 + 2% H$_3$PO$_4$ + 0.3% TAMOL | 673 |
| 21 | 4T30 + 2% H$_3$PO$_4$ + 0.4% TAMOL | 673 |
| 22 | Blend of 75% of Untreated 4T30 + 25% of Example 17 | 492 |
| 23 | Blend of 75% of Untreated 4T30 + 25% of Example 18 | 535 |
| 24 | Blend of 75% of Untreated 4T30 + 25% of Example 21 | 604 |

Table III shows that the addition of TAMOL continues to significantly increase the drainage properties of the fiber up to a TAMOL content somewhere between 0.1 and 0.3 percent. If only treated asbestos fibers were to be used to make final products there would be no advantage in using more than this optimum amount of TAMOL, but usually the treated fibers make up only a small portion of the total solids used to make a final product. Examples 22–24 show that when the treated fiber is used in a blend with 75 percent untreated fiber the drainage characteristics continue to improve as the TAMOL content of the treated fiber increases from 0 percent to 0.4 percent. Based on the results from Table III it would be expected that when only 25 percent of the treated fiber is used in the blend the treated fiber should contain between 0.4 and 1.2 percent TAMOL for optimum drainage characteristics. The results of Examples 17–24 cannot be compared directly with the results of Examples 1–9 or 10–16 because the tests were run at different times using different lots of 4T30 asbestos fibers and with possible differences in impurity levels and temperature in the tap water used, all of which can significantly alter drainage characteristics.

Although the fibers treated in the work reported in this specification were 4T30 fibers, the treatment of the present invention is applicable to any type of chrysotile asbestos fibers. Also, although the preferred dispersant, TAMOL, was used in all of the work reported in this specification, the other dispersants described previously would also be suitable. While the preferred process of applying the phosphate compound and the TAMOL to the asbestos fibers is during the time the asbestos fibers are entrained in a fluid stream, it would also be possible to apply the treating compounds to the asbestos fiber by spraying the fiber while the latter is being agitated in a mixer as disclosed in U.S. Pat. No. 3,644,138.

I claim:

1. A process for improving the drainage characteristics of chrysotile asbestos fibers which comprises treating said fibers with an aqueous solution of a phosphate compound, or of a corresponding acid, to form on the fiber a deposit of up to 5 weight percent of the fibers, the improvement comprising subsequently adding to the treated fibers at least about 0.05 weight percent, based on the weight of the fibers, of a nonfoaming anionic sulfonated dispersant.

2. A process as defined in claim 1 wherein the amount of dispersant added to the fibers is in the range of about 0.1 to about 1.2 weight percent.

3. A process as defined in claim 3 wherein the amount of said dispersant added to the fibers is in the range of about 0.2 to about 0.8 weight percent.

4. A process as defined in claim 1 wherein the amount of dispersant added is in the range of about 0.2 and 0.4 weight percent.

5. A process as defined in claim 1 wherein the dispersant is added by spraying either a dry powder or an aqueous solution of the dispersant onto the treated fibers.

6. A process as defined in claim 3 wherein the dispersant is added by spraying either a dry powder or an aqueous solution of the dispersant onto the treated fibers.

7. A process as defined in claim 1 wherein the dispersant is added in bulk form to the treated asbestos fibers.

8. A process as defined in claim 3 wherein the dispersant is added in bulk form to the treated asbestos fibers.

9. A process as defined in claim 1 wherein the dispersant is a sodium salt of a condensed naphthalene sulfonic acid.

10. A process as defined in claim 3 wherein the dispersant is a sodium salt of a condensed naphthalene sulfonic acid.

11. Chrysotile asbestos fibers in a loose form containing a phosphate compound or corresponding acid, on the surfaces thereof, the improvement comprising a nonfoaming anionic sulfonated dispersant also present with the fibers in an amount of at least 0.05 weight percent, based on the weight of the asbestos fibers.

12. Chrysotile asbestos fibers as defined in claim 11 wherein the dispersant is present in an amount in the range of about 0.1 to about 1.2 weight percent.

13. Chrysotile asbestos fibers as defined in claim 12 wherein the dispersant is present in an amount in the range of about 0.2 to about 0.8 weight percent.

14. Chrysotile asbestos fibers as defined in claim 13 wherein the dispersant is present in an amount in the range of about 0.2 to about 0.4 weight percent.

15. Chrysotile asbestos fibers as defined in claim 12 wherein the dispersant is nonuniformly distributed among the fibers.

16. Chrysotile asbestos fibers as defined in claim 13 wherein the dispersant is nonuniformly distributed among the fibers.

17. Chrysotile asbestos fibers as defined in claim 12 wherein at least a portion of the dispersant is present as a coating on the fibers.

18. Chrysotile asbestos fibers as defined in claim 13 wherein at least a portion of the dispersant is present as a coating on the fibers.

19. Chrysotile asbestos fibers as defined in claim 11 wherein the dispersant is a sodium salt of a condensed naphthalene sulfonic acid.

20. Chrysotile asbestos fibers as defined in claim 13 wherein the dispersant is a sodium salt of a condensed naphthalene sulfonic acid.

21. A process of forming a product containing chrysotile asbestos fibers, at least a portion of the fibers having been treated with a phosphate compound, or corresponding acid, wherein a slurry or paste containing said fibers is deposited on a porous surface and a fibrous product is formed by filtration, the improvement comprising adding to the aqueous slurry or paste at least about 0.05 weight percent, based on the weight of chrysotile asbestos fibers present, nonfoaming anionic sulfonated dispersant.

22. A process as defined in claim 21 wherein the amount of dispersant added is in the range of about 0.1 to about 0.8 weight percent.

23. A process as defined in claim 22 wherein the amount of dispersant added is in the range of about 0.2 to about 0.4 weight percent.

24. A process as defined in claim 22 wherein the dispersant is added to the slurry as a separate addition.

25. A process as defined in claim 24 wherein at least a portion of the dispersant added is in the form of a coating on the chrysotile asbestos fibers.

26. A process as defined in claim 22 wherein the dispersant is added to the slurry before the chrysotile asbestos fibers are added.

27. A process as defined in claim 22 wherein the dispersant is added to the slurry after the chrysotile asbestos fibers have been added.

28. A process as defined in claim 22 wherein the slurry also contains hydraulic cement particles.

29. A process as defined in claim 22 wherein the dispersant is a sodium salt of a condensed naphthalene sulfonic acid.

30. A process as defined in claim 23 wherein the dispersant is a salt of a condensed naphthalene sulfonic acid.

* * * * *